US012561318B2

(12) United States Patent
Maschoff et al.

(10) Patent No.: US 12,561,318 B2
(45) Date of Patent: Feb. 24, 2026

(54) METHODS FOR MANAGING A DIGITAL ECOSYSTEM FOR REAL ESTATE PROPERTY DATA AND DEVICES THEREOF

(71) Applicant: Jones Lang LaSalle IP, Inc., Chicago, IL (US)

(72) Inventors: Douglas Maschoff, Dallas, TX (US); Tyler Conrad Hinkelman, Dallas, TX (US); Ahmed Shahid, Prosper, TX (US); Christopher Huff, Bonall, CA (US)

(73) Assignee: JONES LANG LASALLE IP, INC., Chicago, IL (US)

( * ) Notice: Subject to any disclaimer, the term of this patent is extended or adjusted under 35 U.S.C. 154(b) by 36 days.

(21) Appl. No.: 18/740,986

(22) Filed: Jun. 12, 2024

(65) Prior Publication Data

US 2025/0384029 A1    Dec. 18, 2025

(51) Int. Cl.
| | |
|---|---|
| *G06F 16/00* | (2019.01) |
| *G06F 16/242* | (2019.01) |
| *G06F 16/29* | (2019.01) |
| *G06Q 50/16* | (2012.01) |

(52) U.S. Cl.
CPC ............ *G06F 16/243* (2019.01); *G06F 16/29* (2019.01); *G06Q 50/16* (2013.01)

(58) Field of Classification Search
CPC ............................... G06F 16/243; G06F 16/29
See application file for complete search history.

(56) References Cited

U.S. PATENT DOCUMENTS

| | | | | |
|---|---|---|---|---|
| 9,170,715 | B1 * | 10/2015 | Alini | .................. G06Q 30/0627 |
| 9,224,177 | B2 * | 12/2015 | Thomas | ................ G06Q 10/06 |
| 9,389,096 | B2 * | 7/2016 | Holden | ................ G01C 21/367 |
| 9,473,511 | B1 * | 10/2016 | Arunkumar | ........... H04L 63/107 |
| 12,271,967 | B2 * | 4/2025 | Fahl | ........................ G06Q 40/06 |
| 2004/0088172 | A1 * | 5/2004 | Baglioni | ............ G06Q 30/0601 |
| | | | | 705/26.1 |
| 2006/0190285 | A1 * | 8/2006 | Harris | .................... G06Q 30/02 |
| | | | | 705/1.1 |
| 2008/0307512 | A1 * | 12/2008 | Tandon | .................. G06Q 50/16 |
| | | | | 715/780 |
| 2015/0317581 | A1 * | 11/2015 | Fawaz | ............... G06Q 10/0639 |
| | | | | 705/313 |
| 2017/0132728 | A1 * | 5/2017 | Westerberg | ............ G06Q 50/16 |
| 2017/0365019 | A1 * | 12/2017 | He | ...................... G06F 16/9038 |

(Continued)

*Primary Examiner* — Noosha Arjomandi
(74) *Attorney, Agent, or Firm* — Troutman Pepper Locke LLP

(57) ABSTRACT

This technology relates to intelligently generate a search query to access data. A method, computing device, and non-transitory computer readable medium include receiving a search request comprising natural language text. Next a prompt from the natural language text is extracted. A search generation machine learning module is executed to generate one or more search criteria based on the extracted prompt, wherein the search generation machine learning module is trained to learn data storage structure information of a data storage and map a prompt to one or more search criteria based on the learned data storage structure information. The data storage is searched based on the one or more search criteria to obtain a search result. The search result is displayed via a user interface as a response to the search request.

20 Claims, 13 Drawing Sheets

100

(56)          References Cited

U.S. PATENT DOCUMENTS

| | | | |
|---|---|---|---|
| 2018/0053227 A1* | 2/2018 | Camhi | G06Q 30/0281 |
| 2019/0057468 A1* | 2/2019 | Branscomb | H04L 9/088 |
| 2019/0080425 A1* | 3/2019 | Bui | G06Q 10/0631 |
| 2020/0349176 A1* | 11/2020 | Daimler | G06F 16/335 |
| 2022/0351314 A1* | 11/2022 | Branscomb | G08G 5/55 |
| 2023/0089025 A1* | 3/2023 | Bomze | G06N 20/00 |
| | | | 705/315 |
| 2023/0214925 A1* | 7/2023 | Cella | G06Q 30/06 |
| | | | 705/37 |
| 2025/0200680 A1* | 6/2025 | St. Martin | G06Q 50/16 |
| 2025/0232392 A1* | 7/2025 | Fahl | G06Q 50/16 |

* cited by examiner

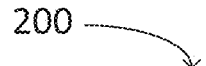
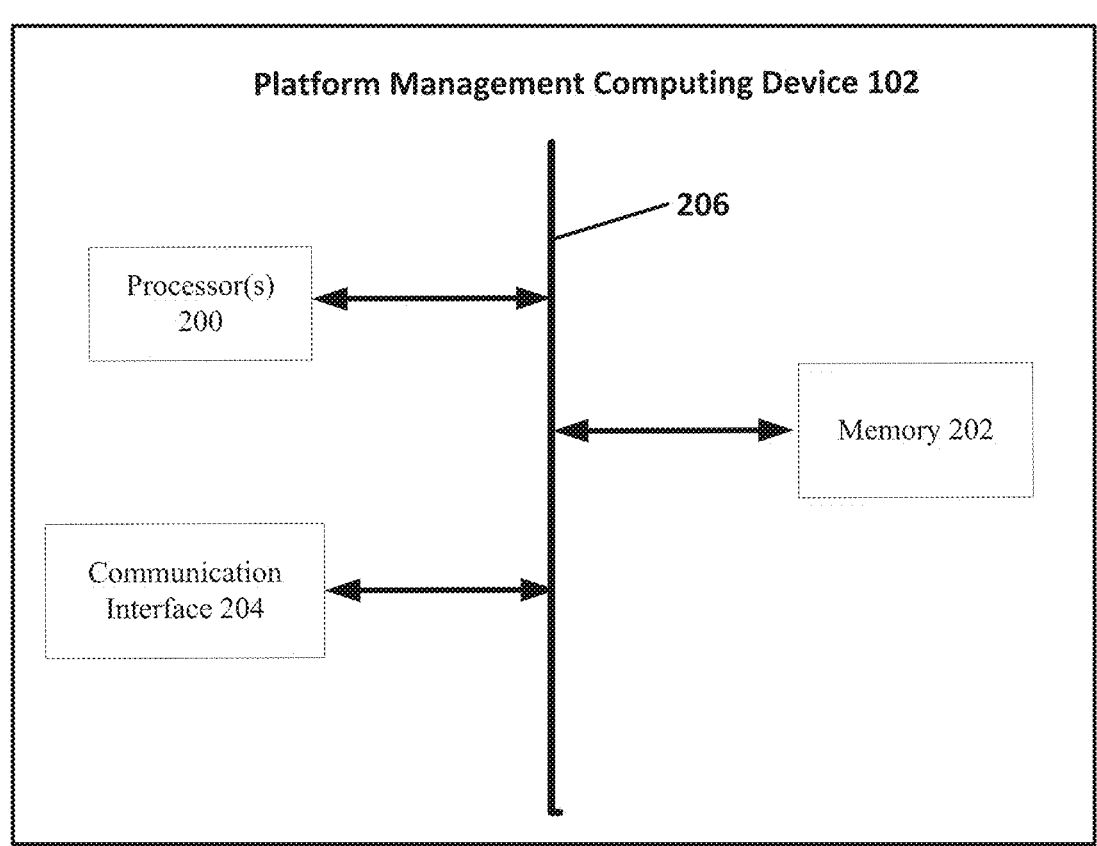
FIG. 2

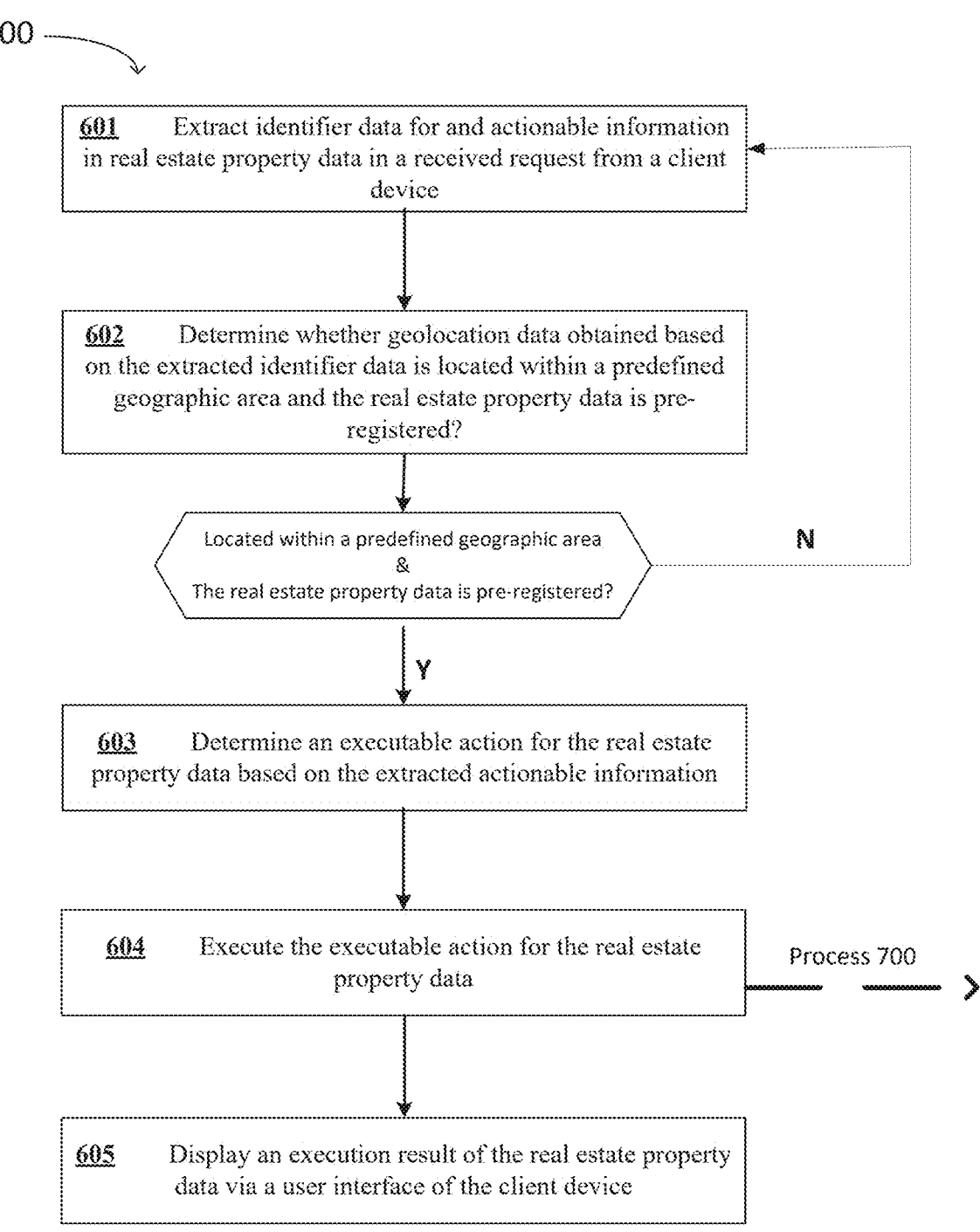

600

601 Extract identifier data for and actionable information in real estate property data in a received request from a client device

602 Determine whether geolocation data obtained based on the extracted identifier data is located within a predefined geographic area and the real estate property data is pre-registered?

Located within a predefined geographic area
&
The real estate property data is pre-registered?

N

Y

603 Determine an executable action for the real estate property data based on the extracted actionable information

604 Execute the executable action for the real estate property data

Process 700

605 Display an execution result of the real estate property data via a user interface of the client device

Figure 12:
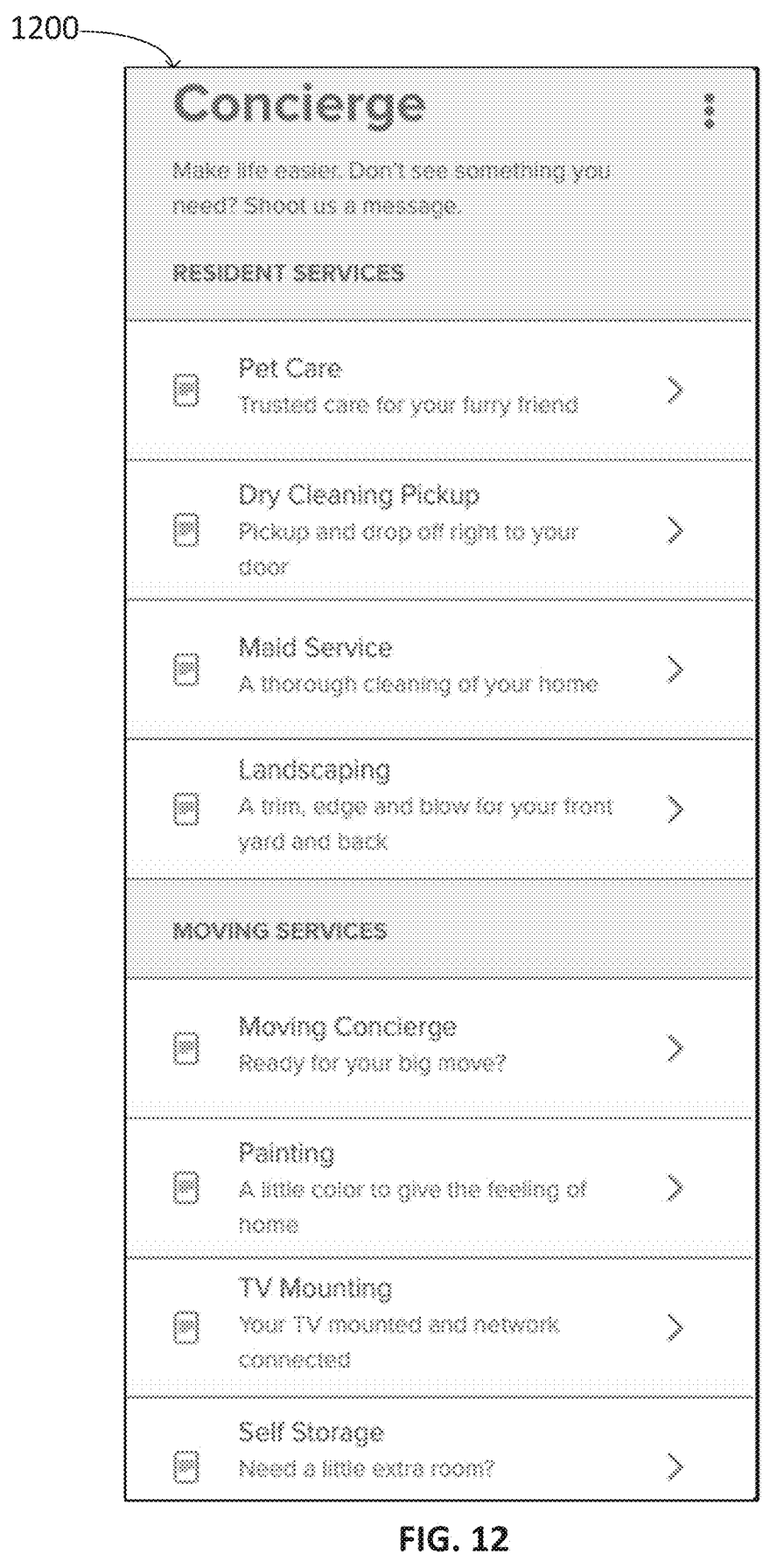

Concierge ⋮

Make life easier. Don't see something you
need? Shoot us a message.

RESIDENT SERVICES

Pet Care
Trusted care for your furry friend    >

Dry Cleaning Pickup
Pickup and drop off right to your
door    >

Maid Service
A thorough cleaning of your home    >

Landscaping
A trim, edge and blow for your front
yard and back    >

MOVING SERVICES

Moving Concierge
Ready for your big move?    >

Painting
A little color to give the feeling of
home    >

TV Mounting
Your TV mounted and network
connected    >

Self Storage
Need a little extra room?    >

METHODS FOR MANAGING A DIGITAL ECOSYSTEM FOR REAL ESTATE PROPERTY DATA AND DEVICES THEREOF

FIELD

This technology relates to methods, computing devices, and non-transitory computer readable medium that manage a digital ecosystem for real estate property data.

BACKGROUND

Maintaining and managing real estate property data is a challenge. Often real estate property data related to the same real estate property can be scattered across and stored in a variety of different systems. For example, real estate property data related to the same real estate property may be maintained by government offices, insurance companies, real estate property transaction platforms, home security companies, home service companies, etc.

Across those different systems, there can be overlapping portions of the same real estate property data, such as the ownership data, address data, size data, build year date, or the like. However, when a portion of the real estate property data for changes in one system, there can be a delay in updating or even notifying the other systems. In some instances, some of the systems which have the same real estate data for a particular real estate property may never been notified of the change, resulting in an inconsistency with the real estate property data for the same real estate property among those systems. For example, a transaction of a real estate property causing an ownership change, or a mortgage of the real estate property to a bank or a third party, will cause an immediate change in a record of this real estate property in the bank's or third party's systems. However, there could be a delay and/or absence of notifying of this change in the real estate property data to the other systems which also have stored real estate data for that property. Accordingly, such inconsistency may obviously result in errors when this real estate property data has not been properly maintained and updated and is some circumstance this error even be utilized for a malicious or illegal purpose.

Further, the scattered storage and maintenance of real estate property data for a real estate property may cause a low processing issue. For example, sometimes there may be a need to identify and access the necessary real estate property data for a real estate property which may be stored across a number of different systems making access to the necessary data more difficult, time consuming and inefficient.

Furthermore, keeping real estate property data associated with the same real estate property across a plurality of different systems increases the security risk as well as potential loss or tampering risk for that data. Therefore, there is a need to maintain and manage real estate property data more effectively and efficiently across systems in a more intelligent and secure manner.

SUMMARY

A method for managing a digital ecosystem for real estate property data includes extracting, by a computing device, identifier data for and actionable information in real estate property data in a received request from a client device. The method further includes determining, by the computing device, whether geolocation data obtained based on the extracted identifier data for the real estate property data in the received request is located within one of one or more predefined stored geographic areas and whether the real estate property data is pre-registered. In response to the determination that the real estate property data is located within the one of the one or more predefined stored geographic areas and the real estate property data is pre-registered, the method includes determining, by the computing device, an executable action for the real estate property data based on the actionable information extracted from the received request submitted by an authenticated user via the client device. The determined executable action is executed by the computing device on the real estate property data, and the execution result is provided in response to the received request to the computing device.

A computing device with a memory comprising programmed instructions stored thereon and one or more processors configured to execute the stored programmed instructions to extract identifier data for and actionable information in real estate property data in a received request from a client device. A determination is made whether geolocation data obtained based on the extracted identifier data for the real estate property data in the received request is located within one of one or more predefined stored geographic areas and whether the real estate property data is pre-registered. In response to the determination that the real estate property data is located within the one of the one or more predefined stored geographic areas and the real estate property data is pre-registered, an executable action for the real estate property data based on the actionable information extracted from the received request submitted by an authenticated user via the client device. The determined executable action is executed on the real estate property data and the execution result is provided in response to the received request to the client device.

A non-transitory computer readable medium having stored thereon instructions comprising executable code which when executed by one or more processors, causes the one or more processors to extract identifier data for and actionable information in real estate property data in a received request from a client device. A determination is made whether geolocation data obtained based on the extracted identifier data for the real estate property data in the received request is located within one of one or more predefined stored geographic areas and whether the real estate property data is pre-registered. In response to the determination that the real estate property data is located within the one of the one or more predefined stored geographic areas and the real estate property data is pre-registered, an executable action for the real estate property data based on the actionable information is determined. The determined executable action is executed on the real estate property data and the execution result is provided in response to the received request to the client device the client device.

This technology provides a number of advantages including providing methods, non-transitory computer readable media, and computing devices that more effectively and efficiently maintain and manage real estate property data across systems in a more intelligent and secure manner. Examples of this technology are able to create a digital ecosystem for a given geographical region, and register, store and maintain all related real estate property data associated with a real estate property located within that given geographical region in this digital ecosystem. Additionally, examples of this technology are able to alleviate data inconsistency with respect to the same real estate property among different systems. Furthermore, the digital ecosystem may maintain and manage the stored real estate property data on a geographic area basis to allow for a more productive processing operation and more efficient usage of available resources (e.g., resource of home maintenance may be provided on a geographic areas basis instead of a separate real estate property basis). In addition, the digital ecosystem may also facilitate a user's access of related real estate property data and initiate processing operation on it by removing or at least reducing a need to access a plurality of different systems. Also, security of real estate property data and associated private data may be enhanced and therefore information leakage may be mitigated. Therefore, examples of this technology disclose herein at least alleviate some of above issues.

BRIEF DESCRIPTION OF THE DRAWINGS

The foregoing and other aspects of the present disclosure can be understood from the following detailed description when read in connection with the accompanying drawings. For the purpose of illustrating this technology, specific examples are shown in the drawings, it being understood, however, that the examples of this technology are not limited to the specific instrumentalities disclosed. Included in the drawings are the following Figures:

FIG. 2 is a block diagram of an exemplary execution environment of a platform management computing device;

FIG. 6 is a flowchart of an exemplary method for managing a digital ecosystem for real estate property data;

FIG. 12 is a screenshot of an exemplary graphical user interface provided to a user for initiating a maintenance processing request on the real estate property data to the digital ecosystem.

DETAILED DESCRIPTION

Figure 1:
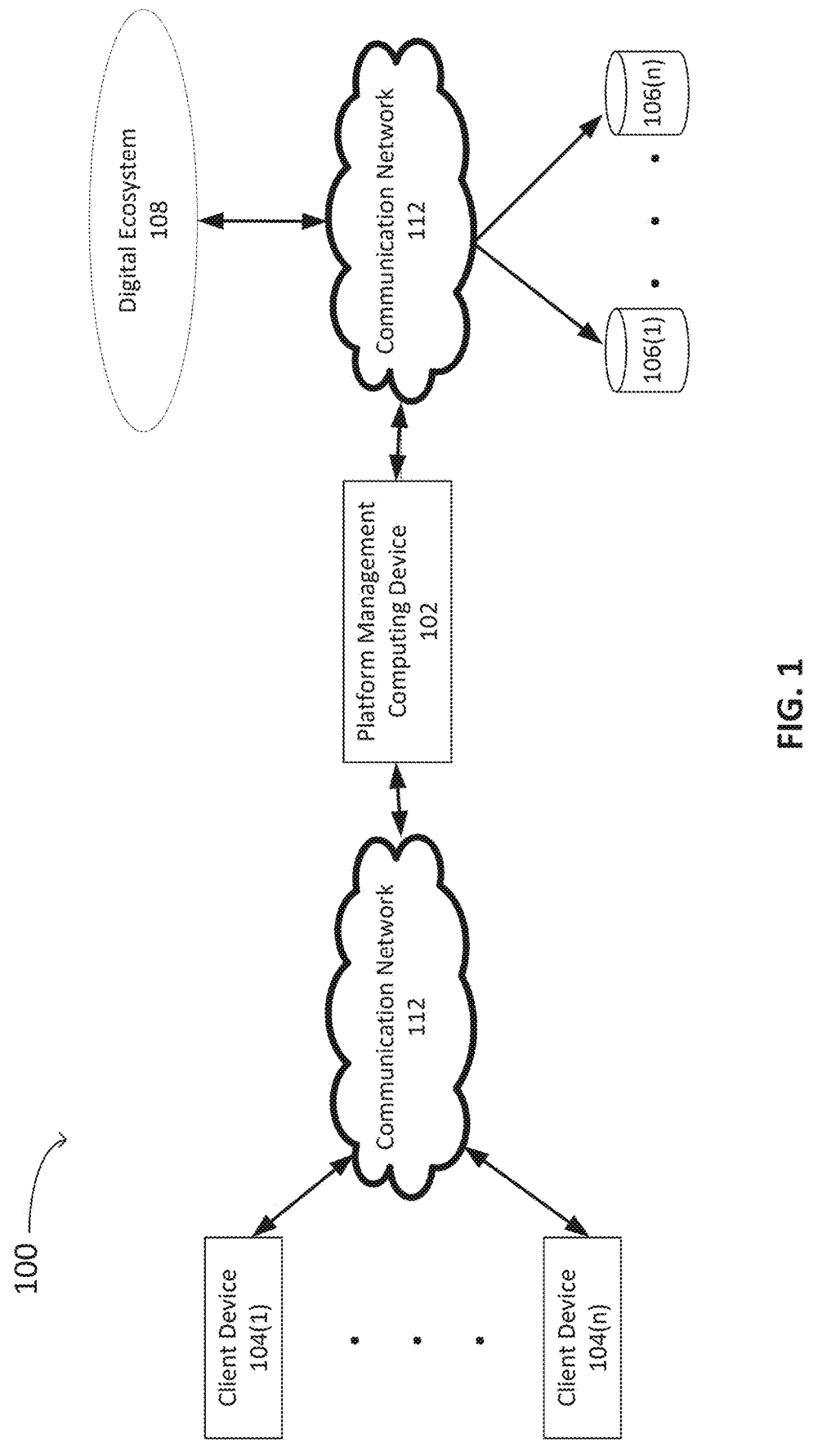
FIG. 1 is a block diagram of an exemplary network environment with a platform management computing device.

A network environment 100 with an exemplary platform management computing device 102 connected with and configured to manage a digital ecosystem 108 for real estate property data is shown in FIG. 1, wherein the platform management computing device 102 may execute an action for the real estate property data based on a request initiated by one of client devices 104(1)-104(n). In this particular example, the environment 100 includes the platform management computing device 102, the client devices 104(1)-104(n), databases 106(1)-106(n), and the digital ecosystem 108 which are coupled together via communication networks 112, although the environment could have other types and/or numbers of other systems, devices, components, and/or other elements in other configurations. This technology provides several advantages including providing methods, non-transitory computer readable media, and computing devices that more effectively and efficiently maintain and manage real estate property data across systems in a more intelligent and secure manner.

Referring more specifically to FIGS. 1 and 2, the platform management computing device 102 of the network environment 100 may perform a number of different functions and/or other operations as illustrated and described by way of the examples herein, including executing an action requested by one of the client devices 104(1)-104(n) on the real estate property data in a digital ecosystem 108. The platform management computing device 102 in this example includes processor(s) 200, a memory 202, and a communication interface 204, which are coupled together by a bus 206, although the platform management computing device 102 can include other types or numbers of elements in other configurations.

The processor(s) 200 of the platform management computing device 102 may execute programmed instructions stored in the memory 202 of the platform management computing device 102 for any number of the functions and other operations as illustrated and described by way of the examples herein. The processor(s) 200 may include one or more central processing units (CPUs) or general-purpose processors with one or more processing cores, for example, although other types of processor(s) can also be used.

The memory 202 of the platform management computing device 102 stores these programmed instructions for one or more aspects of the present technology as described and illustrated herein, although some or all of the programmed instructions could be stored elsewhere. A variety of different types of memory storage devices, such as random-access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the platform management computing device 102, cause the platform management computing device 102 to perform operations as illustrated and described by way of the examples herein to manage the digital ecosystem 108 and execute an action requested by one of the client devices 104(1)-104(n) on the real estate property data stored in the digital ecosystem 108. The application(s) can be implemented as components of other applications, operating system extensions, and/or plugins, for example.

Further, the application(s) may be operative in a cloud-based computing environment with access provided via a software-as-a-service module. The application(s) can be executed within or as virtual machine(s) or virtual server(s) that may be managed in a cloud-based computing environment or containerized based computing environment. Also, the application(s), and even the platform management computing device 102 itself, may be located in virtual server(s) running in a cloud-based (e.g., containerized) computing environment rather than being tied to specific physical network computing devices. Also, the application(s) may be running in virtual machines (VMs) executing on the platform management computing device 102 and managed or supervised by a hypervisor.

The communication interface 204 of the platform management computing device 102 operatively couples and communicates between the platform management computing device 102 and the client devices 104(1)-104(n), the databases 106(1)-106(n), and/or the digital ecosystem 108 via one or more communication networks 112, although other types or numbers of communication networks or systems with other types or numbers of connections or configurations to other devices or elements can also be used.

While the platform management computing device 102 is illustrated in this example as including a single memory 202 and communication interface 204, the platform management computing device 102 in other examples can include a plurality of memories 202 and communication interfaces 204 as appropriate and needed to implement one or more operations or functionalities of this technology.

Figure 3:
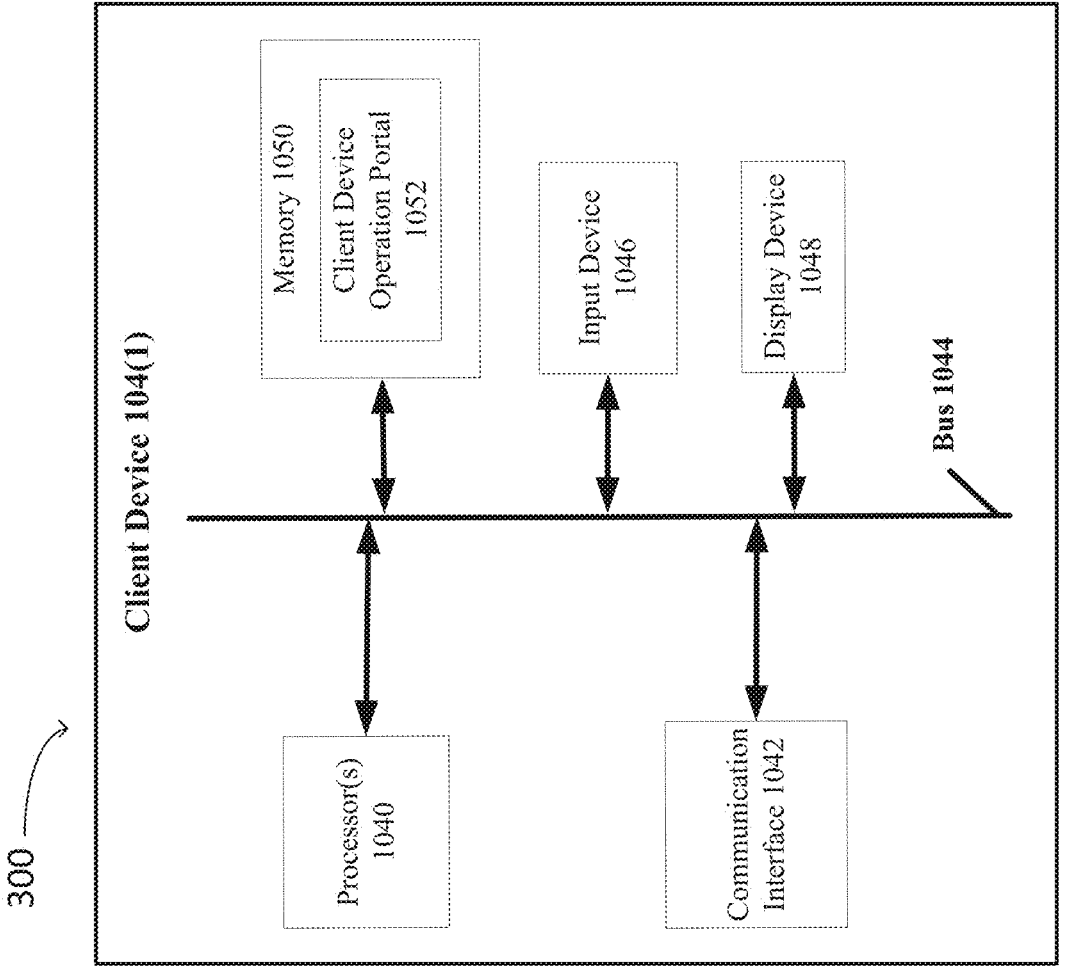
FIG. 3 is a block diagram of an exemplary execution environment of a client device.

Referring to FIG. 3, each of the client devices 104(1)-104(n), illustrated herein as a client device 104(1), includes one or more processors 1040, a memory 1050 comprising a client device operation portal 1052, user input device 1046, such as keyboards and/or mouse pointers by way of example, a display device 1048, such as an LED or LCD display device, and a communication interface 1042, which are coupled together by a bus 1044 or other communication link, although other types and/or numbers and types of components or other elements in other configurations could be used. In this example, referring back to FIG. 1, client device 104(1) may interact with the platform management computing device 102 and initiate a request executing an action on real estate property data in the digital ecosystem 108 via the client device operation portal 1052, although the client device 104(1) could be operated by other applications to implement other functionalities and operations (e.g., accessing and managing other information, such as other types of assets). The client device operation portal 1052 can be any form of user portal for a user of the client device 104(1) to interact with the platform management computing device 102 and access the real property data in the digital ecosystem 108, such as a browser or an application downloadable by a mobile and portable device.

Figure 9:
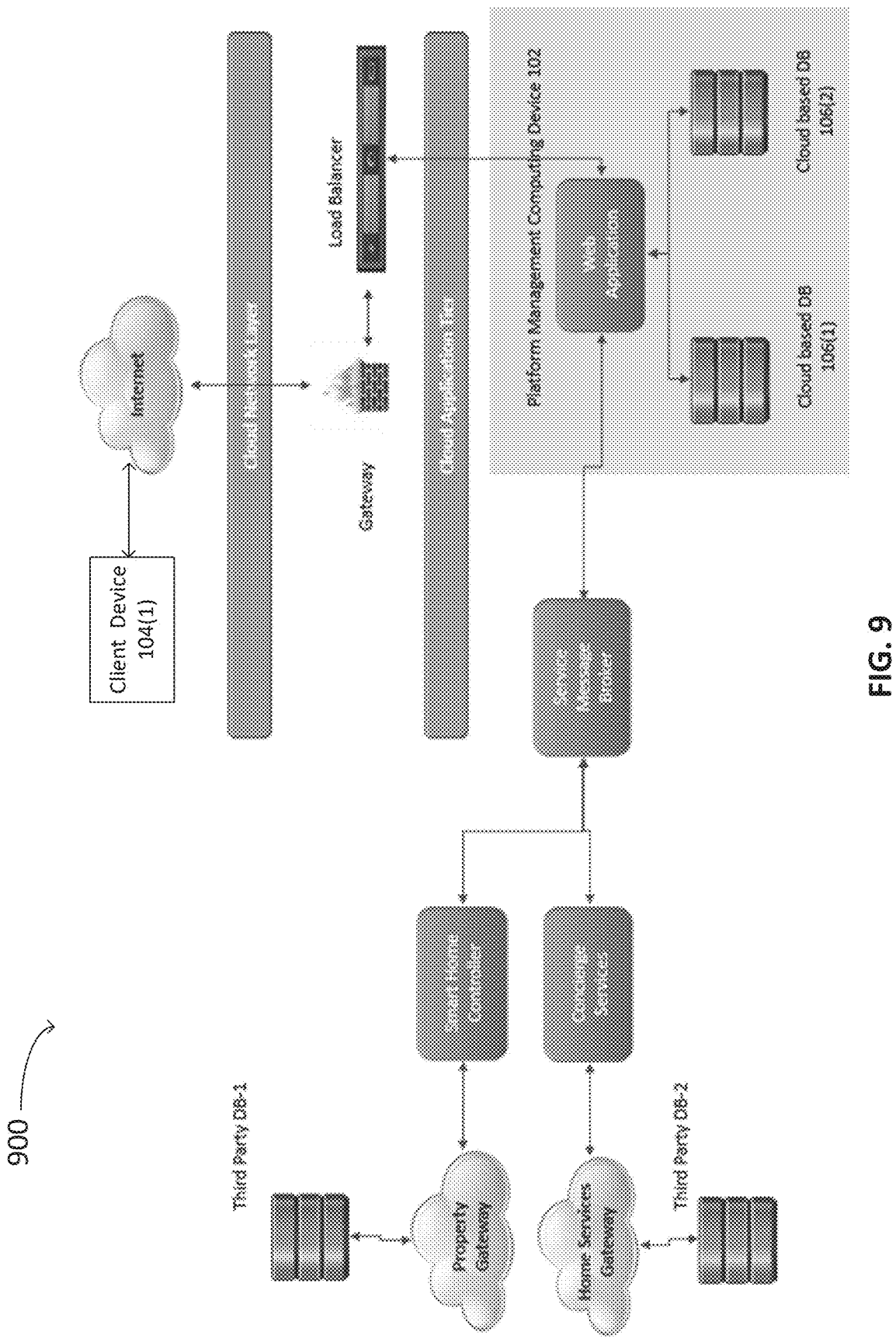
FIG. 9 is an exemplary application environment of a platform management computing device.

Continuing to refer to FIG. 1, the databases 106(1)-106(n) may store real estate property data of the digital ecosystem 108 and additional data associated with a plurality of real estate properties whose data are stored in the digital ecosystem 108, which is accessible by a user via one of the client devices 104(1)-104(n) in this example, although types and/or combinations of data and/or other programmed instructions may also be stored, and other storage locations may be used. The databases 106(1)-106(n) may obtain the additional data from third party resource(s) which are not shown in FIG. 1 but are illustrated in FIG. 9, which will be described in the following.

The communication networks 112 may be, for example, one or more of the same or different combinations of an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although other types and/or numbers of networks in other topologies or configurations may be used.

In the exemplary network environment illustrated in FIG. 1, the platform management computing device 102, the client devices 104(1)-104(n), the databases 106(1)-106(n), and the digital ecosystem 108 are shown as dedicated hardware devices. However, one or more of the platform management computing devices 102, the client devices 104(1)-104(n), the databases 106(1)-106(n), and the digital ecosystem 108 can be implemented in software within one or more other devices located at either the same physical place or distributed in the network environment 100.

Although the exemplary network environment 100 with the platform management computing device 102, the client devices 104(1)-104(n), the databases 106(1)-106(n), and the digital ecosystem 108 are described and illustrated herein, other types or numbers of systems, devices, components, or elements in other topologies can be used in other exemplary network environments. It is to be understood that the systems of the examples described herein are merely for exemplary purposes, as many variations of the specific hardware and software used to implement the examples are possible, as will be appreciated by those skilled in the relevant art(s).

Moreover, one or more of the components depicted in the network environment 100, such as the platform management computing device 102, the client devices 104(1)-104(n), the databases 106(1)-106(n), and the digital ecosystem 108 for example, may also be configured to operate as virtual instances on the same physical machine. In other words, one or more of the platform management computing devices 102, the client devices 104(1)-104(n), the databases 106(1)-106(n), and the digital ecosystem 108 may operate on the same physical device rather than as separate devices communicating through one or more communication networks 112.

The examples of this technology may also be embodied as one or more non-transitory computer readable media having instructions stored thereon, such as in the memory 202 by way of example, for one or more aspects of the present technology, as described and illustrated by way of the examples herein. The instructions in some examples include executable code that, when executed by one or more processors, such as the processor(s) 200, cause the processors to carry out steps and operations necessary to implement the methods of the examples of this technology that are described and illustrated herein.

Figure 4:
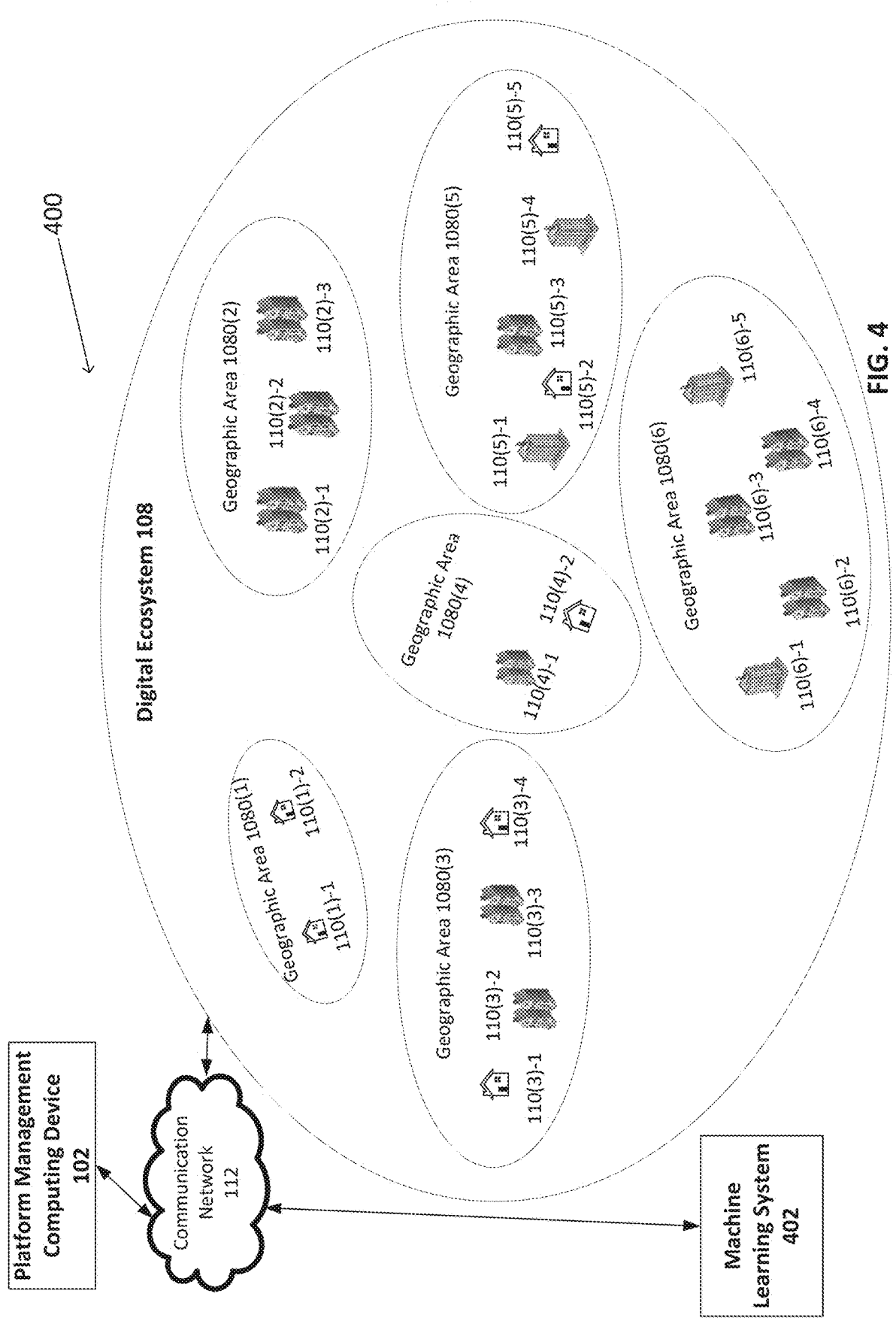
FIG. 4 is an exemplary schematic diagram of a digital ecosystem for real estate property data.

Referring to FIG. 4, the platform management computing device 102 may create a digital ecosystem 108 for a variety of real estate properties. For a given geographic region, the platform management computing device 102 may divide this geographic area into a plurality of smaller geographic areas and create those geographic areas in the digital ecosystem 108 accordingly, illustrated as geographic areas 1080(1)-1080(6) in this example. In FIG. 4, one or more real estate properties are located within each of the geographic areas 1080(1)-1080(6), labeled as real estate properties 110(1)-1, 110(1)-2, real estate properties 110(2)-1-110(2)-3, real estate properties 110(3)-1-110(3)-4, real estate properties 110(4)-1-110(4)-2, real estate properties 110(5)-1-110(5)-5, and real estate properties 110(6)-1-110(6)-5, respectively. Those real estate properties may be, but not limited to, a single house, a townhouse, an apartment building, a shopping mall, or the like. For each of the geographic areas 1080(1)-1080(6), the platform management computing device 102 may register one or more real estate properties within that geographic area. For a registered real estate property, the platform management computing device 102 may create identifier data for this real estate property, and store and manage real estate property data associated with this real estate property in the digital ecosystem 108. The identifier data may comprise geolocation data of the associated real estate property, and information identifying an authenticated user who is authorized to process the stored real estate property data of this real estate property, although other types and/or combinations of identifier data may be used.

While the digital ecosystem 108 is illustrated in this example as including six geographic areas 1080(1)-1080(6) and a certain number and type of real estate properties within each of the geographic areas 1080(1)-1080(6), the digital ecosystem 108 in other examples can include other number of geographic areas, other number and type of real estate properties within each geographic area as appropriate and needed to implement one or more operations or functionalities of this technology. In this regard, a machine learning system 402 may be utilized to execute one or more machine learning modules to analyze practical needs based on a variety of processing requests initiated by the client devices 104(1)-104(n) and implemented one or more operations or functionalities of this technology. For example, related tools may be utilized by the machine learning system 402 to implement machine learning modules, such as various python libraries (e.g., Scikit-Learn) for regression, classification, clustering for module analysis. Next, the trained machine learning system 402 may analyze and conclude an appropriate and dynamic configuration for the digital ecosystem 108.

Figure 5:
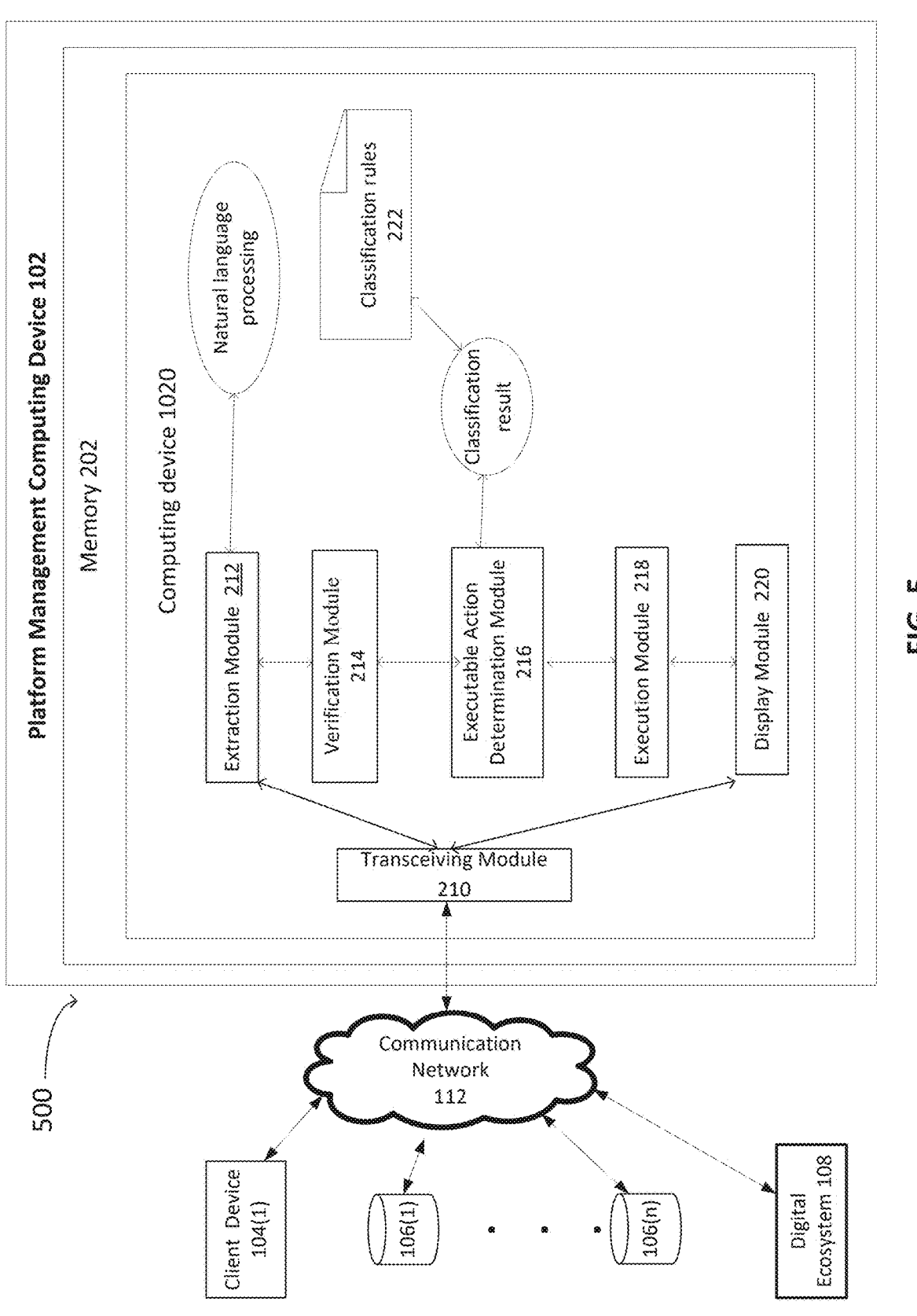
FIG. 5 is a block diagram of an exemplary computing device residing on and being executed by a platform management computing device.

Referring to FIG. 5, a block diagram of an exemplary computing device 1020 is illustrated as residing on and being executed by the platform management computing device 102 for performing one or more steps and operations described herein for this disclosed technology. As shown in FIG. 5, the memory 202 includes the computing device 1020, which in turn comprises a transceiving module 210, an extraction module 212, a verification module 214, an executable action determination module 216, an execution module 218, and a data display module 220. It is to be understood that the memory 202 may comprise other types and/or numbers of other modules, engines, programmed instructions and/or data. In this example, the transceiving module 210 may be configured to communicatively connect with one or more client devices 104(1)-104(n) which is illustrated herein as client device 104(1), one or more databases 106(1)-106(n), and the digital ecosystem 108 as needed and thereby allows a plurality of interactions therebetween. The extraction module 212 may be configured to extract identifier data for real estate property data and actionable information in real estate property data from a request received from one of the client devices 104(1)-104(n). The verification module 214 may obtain geolocation data from the extracted identifier data and determine whether the geolocation is located within any of the geographic areas in the digital ecosystem 108. The executable action determination module 216 may be configured to determine an executable action which is requested by one of the client devices 104(1)-104(n) for the real estate property data based on the actionable information extracted by the extraction module 212. The execution module 218 may be configured to execute the executable action for the real estate property data. The display module 220 may be configured to display an execution result of the real estate property data via the transceiving module 210 and further a user interface of one of the client devices 104(1)-104(n).

Figure 7:
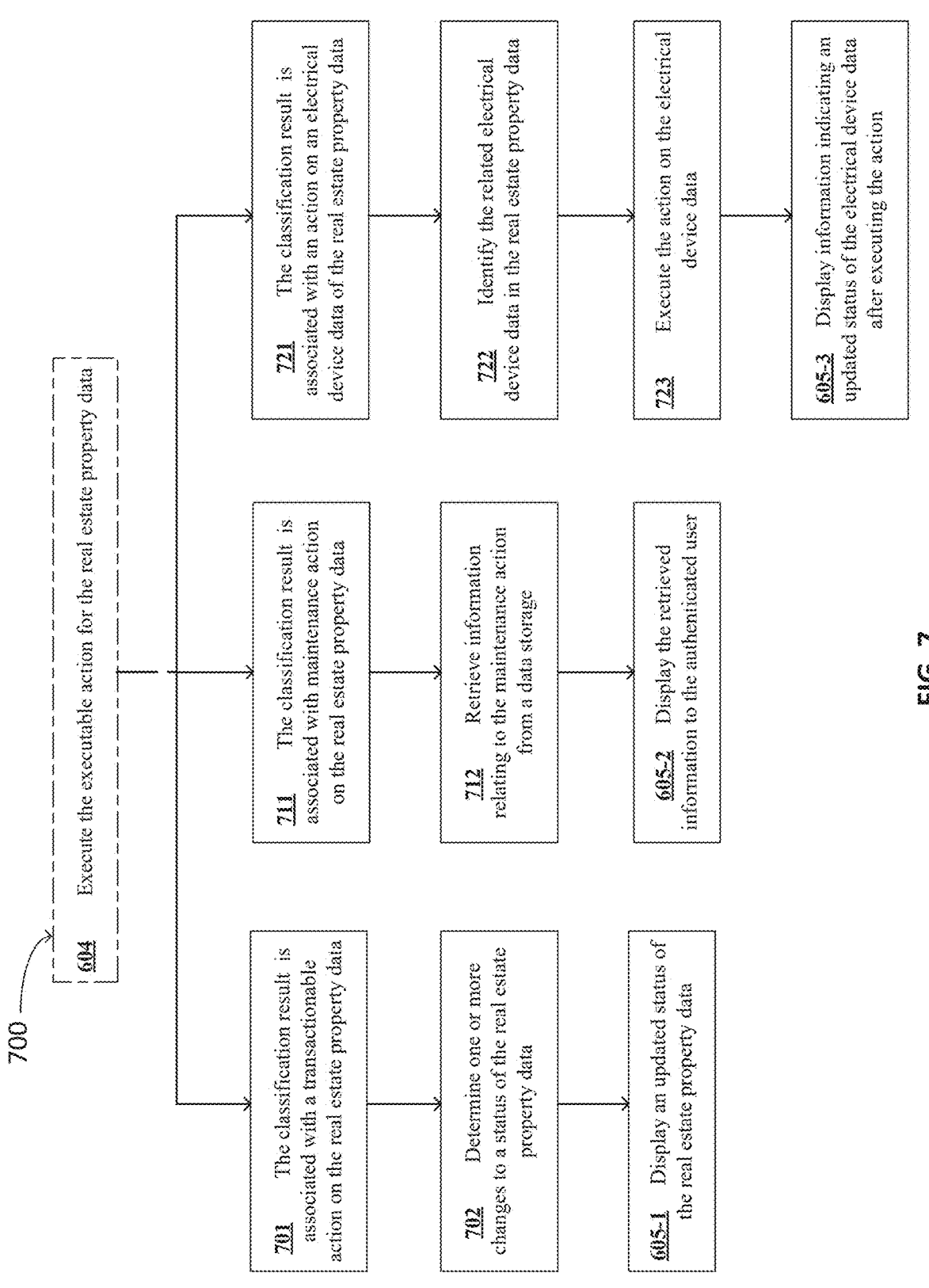
FIG. 7 is a flowchart of an exemplary method for a step of the method illustrated in FIG. 6.

Details of various operations of those modules in the computing device 1020 will be described below in conjunction with FIGS. 6-7. It is to be understood that those modules may execute other types and/or numbers of other functions and/or operations for other types of applications in other examples. Also, it is to be understood that although six modules are illustrated in FIG. 5, however, any of those modules can be combined as needed (e.g., combining the executable action determination module 216 and the execution module 218 into a single module), or any module may be further split or divided into several sub-modules.

While the platform management computing device 102 is illustrated in FIG. 5 as including a single computing device 1020, the platform management computing device 102 in other examples may include a plurality of computing devices each may having one or more processors (each processor with one or more processing cores) that implement one or more steps of this technology. In these examples, one or more of the computing devices may have a dedicated communication interface or memory. Alternatively, one or more of the computing devices can utilize the memory, communication interface, or other hardware or software components of one or more other computing devices included in the platform management computing device 102. Additionally, one or more of the computing devices that together comprise the platform management computing device 102 in other examples can be standalone devices or integrated with one or more other devices or apparatuses.

Referring to FIG. 6, an exemplary method, i.e., process 600, for managing digital ecosystem 108 for real estate property data is illustrated. At step 601, the extraction module 212 of the computing device 1020 may extract identifier data and actionable information from a request initiated by one of the client devices 104(1)-104(n), which is received by the transceiving module 210. The identifier data is included in the request at the client devices 104(1)-104(n) side, to identify the real estate property data stored in the digital ecosystem 108. The actionable information in included in the request to indicate what processions is requested by a user of one of the client devices 104(1)-104(n).

Figure 10:
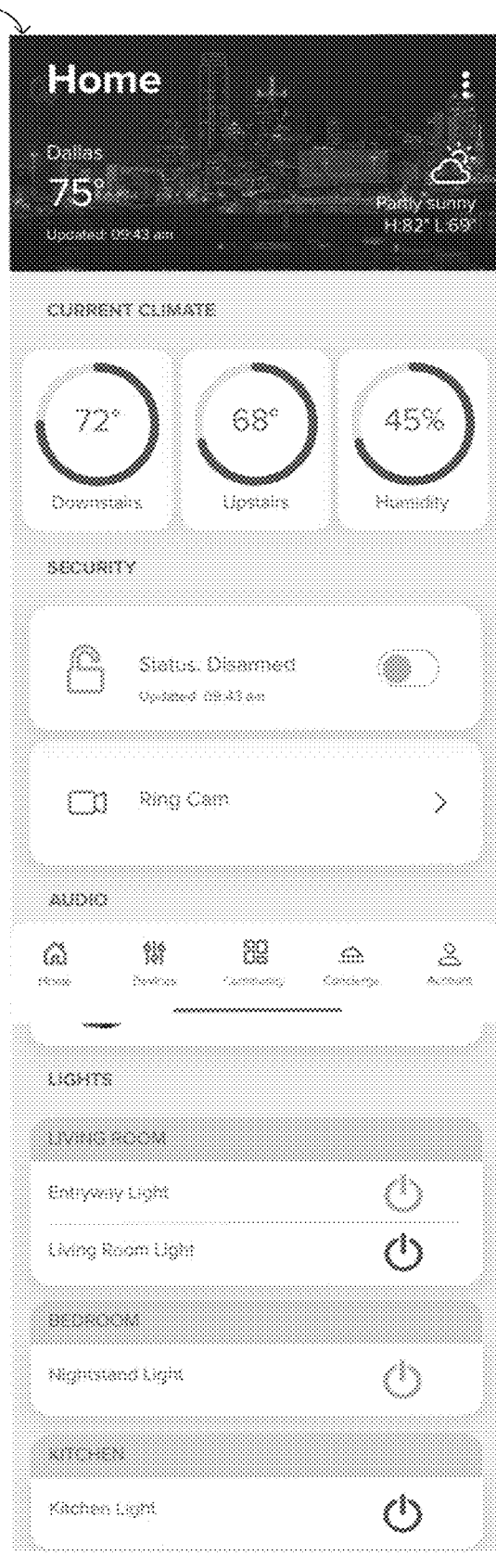
FIG. 10 is a screenshot of an exemplary graphical user interface provided to a user for accessing real estate property data in the digital ecosystem.

FIG. 9 illustrates an exemplary application environment 900, wherein one client device 104(1) may interact with and initiate a request to the platform management computing device 102 which is illustrated as a web application in this example. In FIG. 9, other related network devices are shown to facilitate interactions of the platform management computing device 102 with two third party databases. It is to be understood that while being illustrated in a specific scenario in application environment 900, other network devices and third-party resources may be related and included in other examples. In this example, the platform management computing device 102 may provide a graphical user interface 1000 as illustrated in FIG. 10.

The graphical user interface 1000 may be provided via the client device operation portal 1052 of the client devices 104(1)-104(n). A user of one of the client devices 104(1)-104(n) may browse graphical user interface 1000 and access the real estate property data stored in the digital ecosystem 108. A request for executing an action on the real estate property data may be generated by the one of the client devices 104(1)-104(n) and transmitted to the platform management computing device 102. Next, the computing device 1020 executing at back end on the platform management computing device 102 may receive the request via the transceiving module 210. In this way, the extraction module 212 may extract the data input by the user into the graphical user interface 1000.

In some examples, referring back to FIG. 5, the extraction module 212 may be configured to perform natural language processing on the user input data in the request, to identify and extract the actionable information. In this regard, additional tools and modules may be utilized as needed to fulfill this operation. For example, the extraction module 212 may utilize a word embedding tool to capture semantics within the user input data and analyze the relationships among words.

At step 602, the verification module 214 of the computing device 1020 may be configured to obtain geolocation data from the identifier data extracted by the extraction module 212. As discussed above, the digital ecosystem 108 may create a plurality of geographic areas (e.g., geographic areas 1080(1)-1080(6) in FIG. 4) for a given geographic region, and register, store and manage real estate property data associated with one or more real estate properties located within any of the created geographic areas. In this regard, geolocation data is associated with and therefore utilized to identify real estate property data registered with the digital ecosystem 108. Therefore, based on the geolocation data, the verification module 214 can verify whether the associated real estate property data, on which an action is requested to be executed by the user, is located within any of the predefined geographic areas created by the digital ecosystem 108. Also, the verification module 214 can verify, based on the geolocation data, whether the associated real estate property data is registered with the digital ecosystem 108 already. It is to be understood that it is possible that the real estate property data is for a real estate property located within a specific geographic area, however, not registered with the digital ecosystem 108 yet. In this case, the digital ecosystem 108 may be configured to allow a user to register a real estate property and related real estate property data, depending on specific policy employed by the digital ecosystem 108 (e.g., whether that real estate property is close to or within one existing created geographic area in the digital ecosystem 108). If the verification module 214 determines that the real estate property data is located within one predefined stored geographic area and the real estate property data is pre-registered with the digital ecosystem 108, the process 600 proceeds to step 603.

At step 603, the executable action determination module 216 of the computing device 1020 may be configured to determine an executable action requested by the user for the real estate property data stored in the digital ecosystem 108. The executable action determination module 216 may make this determination based on the actionable information extracted by the extraction module 212 at step 601 from the request received by the transceiving module 210. As discussed above, the real estate property data stored in the digital ecosystem 108 may be accessed and processed by an authenticated user of a specific real estate property. Therefore, a default operation herein includes determining the executable action is requested by an authenticated user via one of the client devices 104(1)-104(n). Information indicating the user identity may be included in the identifier data or the actionable information extracted by the extracting module 212. Moreover, this default operation may be performed by either the executable action determination module 216 when determining the executable action, or by the verification module 214.

As discussed above, the digital ecosystem 108 may maintain all real estate property data for a specific real estate property. That is to say, the digital ecosystem 108 may maintain complete real estate property data and therefore may provide a variety of process or operations on the maintained data based on an authenticated user's request. For example, the operations may relate to but not limited to performing a transactionable, maintenance, or control action (e.g., landscaping, repairs, home services, etc.) on the real estate property data. Therefore, referring back to FIG. 5, the executable action determination module 216 may be configured to access to a plurality of predetermined classification rules 222 to classify the actionable information extracted by the extraction module 212. Herein, the predetermined classification rules 222 may be stored in a local storage of the platform management computing device 102 or stored at any of the databases 106(1)-106(n). The executable action determination module 216 may obtain a classification result during the classification operation. Next with the obtained classification result and the actionable information extracted by the extraction module 212, the executable action determination module 216 may generate the executable action requested by the user.

At step 604, the execution module 218 of the computing device 1020 may be configured to execute the executable action for the real estate property data. In some examples, when predetermined classification rules are utilized by the executable action determination module 216 as discussed above, more detailed operations may be performed as illustrated in FIG. 7, which will be described in the following. Otherwise, the process 600 proceeds to step 605.

At step 605, the display module 220 of the computing device 1020 may be configured to display an execution result after the requested execution being performed by the execution module 218 on the real estate property data stored in the digital ecosystem 108. The display module 220 may cause the execution result to be transmitted via the transceiving module 210 and displayed via a user interface of one of the client devices 104(1)-104(n) via the client device operation portal 1052.

As discussed above, the executable action determination module 216 may obtain a plurality of different classification results during the operation of determining the executable action for the stored real estate property data at step 603. Next, the execution module 218 executes the determined executable action on the real estate property data at step 604, the specific execution may vary depending on the obtained classification result. FIG. 7 illustrates an exemplary process 700 in such scenario. As illustrated at 701, 711, and 721, the classification result of the actionable information may relate to a different type of process on the real estate property data requested by a user of one of the client devices 104(1)-104(n).

Figure 11:
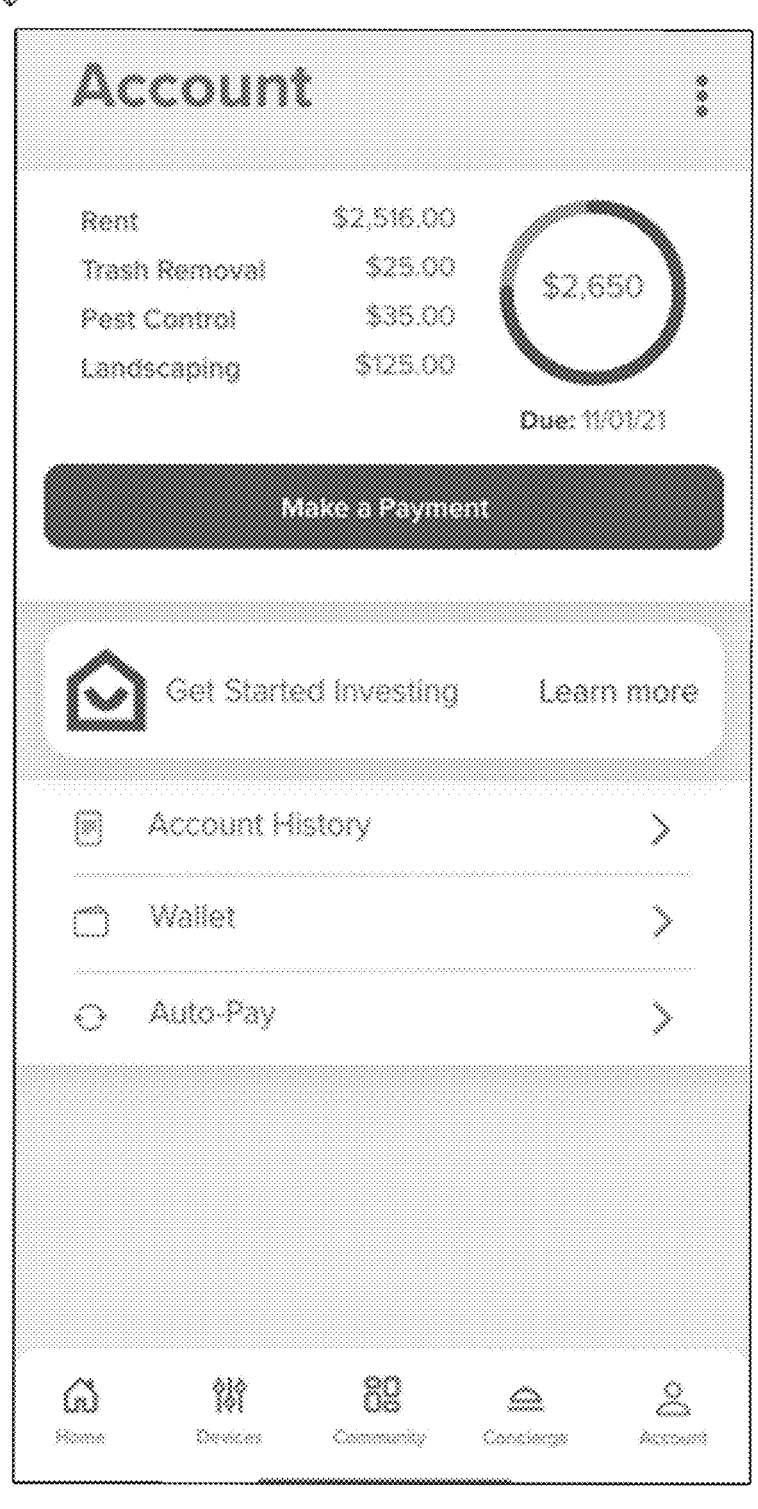
FIG. 11 is a screenshot of an exemplary graphical user interface provided to a user for initiating a transactionable processing request on the real estate property data to the digital ecosystem.

As shown at 701, the classification result may indicate that the user requests the platform management computing device 102 to perform a transactionable action on the real estate property data. In FIG. 11, an exemplary graphical user interface 1100 is illustrated for a user of the client devices 104(1)-104(n) to initiate a transactionable processing request on the real estate property data to the platform management computing device 102. Similar to FIG. 10, the graphical user interface 1100 may be provided via the client device operation portal 1052 of the client devices 104(1)-104(n).

At step 702, the execution module 218 may be configured to further determine one or more changes to a status of the real estate property data, after executing the determined executable action on the real estate property data.

Next at step 605-1, the display at step 605 in FIG. 6 may comprise an updated status of the real estate property data determined by the execution module 218.

For example, the transactionable action may include but not limited to a monthly loan payment requested by the user after checking the property mortgage details of related real estate property data, a change of ownership in the related real estate property data, balances in related real estate property data, or any other transactionable process on the real estate property data (e.g., process relates to other title management, insurance services, tax relevant process such as tax assess). By way of example, in a scenario wherein the transactionable action comprising a transfer of a partial ownership of real estate property in the related real estate property data, the execution module 218 may be configured to tokenize the ownership of the real estate property into ownership tokens. In this way, each of the tokenized ownerships of the real estate property data may represents a different part of the ownership of the related real estate property. Next the execution module 218 may perform the requested transfer of the ownership, which is indicated in the transactionable action, by changing the associated tokens. The execution module 218 then may update the ownership tokens in the real estate property data accordingly. In this case, the display of the execution result at step 605-1 may comprise display of updated ownership in the real estate property data.

As shown at 711, the classification result of the actionable information may indicate that the user of one of the client devices 104(1)-104(n) requests the platform management computing device 102 to perform a maintenance action on the real estate property data. In FIG. 12, an exemplary graphical user interface 1200 is illustrated for a user of the client devices 104(1)-104(n) to initiate a maintenance processing request on the real estate property data to the platform management computing device 102. Similar to FIG. 10, the graphical user interface 1200 may be provided via the client device operation portal 1052 of the client devices 104(1)-104(n). In this case, the execution module 218 may conduct a search of data maintained in any of the databases 106(1)-106(n) or any connectable third-party resources (e.g., third party DB-1, third party DB-2 in FIG. 9) if needed, during the execution of the determined executable action on the real estate property data at step 604 in FIG. 6.

At step 712, the execution module 218 may be configured to further retrieve relevant information relating to the maintenance action, by way of example, from any appropriate resource as discussed above. Herein, the retrieved information may comprise one or more operations selectable by the user of one of the client devices 104(1)-104(n) to execute the requested maintenance action.

Next, at step 605-2, the display at step 605 in FIG. 6 may comprise display the retrieved information to the user of one of the client devices 104(1)-104(n).

As an example, the maintenance action requested by the user of one of the client devices 104(1)-104(n) may include but not limited to cutting grass, repairs (e.g., fixing broken light on the street or utilities within a real estate property, upkeeping the neighborhood within one of the geographic areas 1080(1)-1080(6) in FIG. 4, etc.), landscaping, maid service (e.g., dry cleaning), home services (e.g., pet services such as pet case, pet walking). In this regard, the retrieved information by the execution module 218 may comprise one or more options or operations for the user to choose. Next, the user may confirm or submit a specific maintenance action for the related real estate property data and therefore causing the action to be conducted for the real estate property indicated by the real estate property data.

Figure 13:
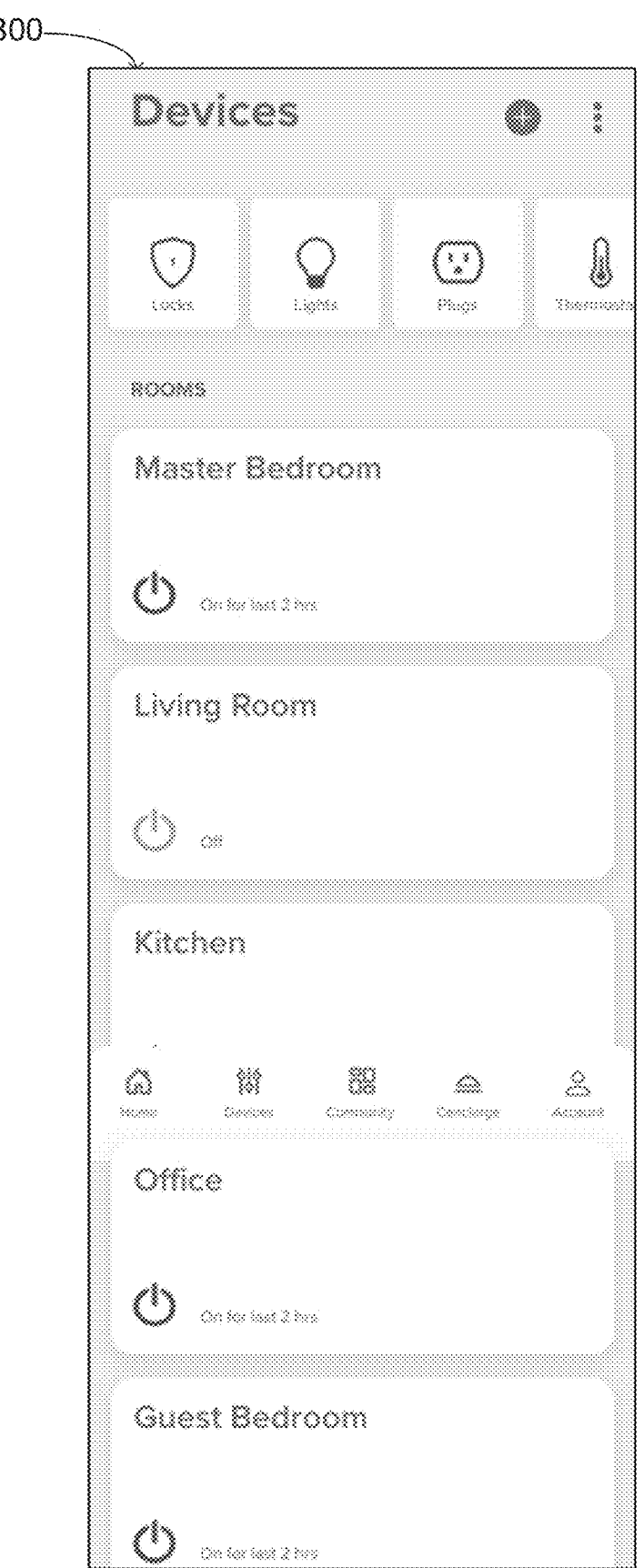
FIG. 13 is a screenshot of an exemplary graphical user interface provided to a user for initiating an electrical device control processing request on the real estate property data to the digital ecosystem.

As shown at 721, the classification result of the actionable information may indicate that the user of one of the client devices 104(1)-104(n) requests the platform management computing device 102 to perform an action on an electrical device data of the real estate property data, therefore conducting an action on an electrical device located within a real estate property indicated by the real estate property data. In FIG. 13, an exemplary graphical user interface 1300 is illustrated for a user of the client devices 104(1)-104(n) to initiate an electrical device control processing request on the real estate property data to the platform management computing device 102. Similar to FIG. 10, the graphical user interface 1300 may be provided via the client device operation portal 1052 of the client devices 104(1)-104(n).

At step 722, the execution module 218 may be configured to identify the related electrical device data in the real estate property data, therefore locate the corresponding electrical device within the real estate property.

Next at step 723, the execution module 218 may be configured to execute the requested action on the electrical device data, causing a corresponding action being performed on the electrical device.

Next at 605-3, the display at step 605 in FIG. 6 may comprise display information indicating an updated status of the electrical device data after executing the action, which corresponds to an updated status of the electrical device within the real estate property.

Figure 8:
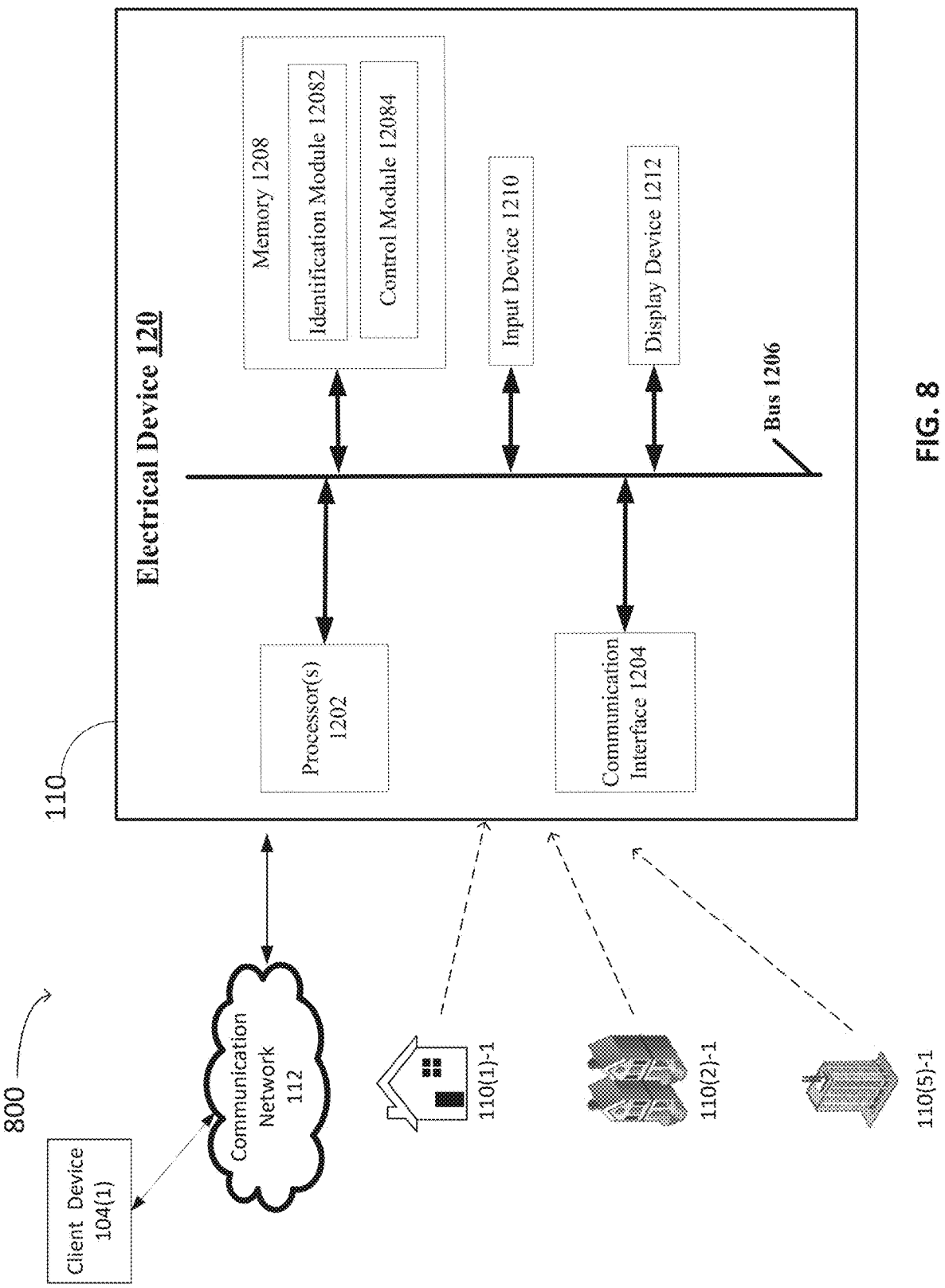
FIG. 8 is a block diagram of an exemplary execution environment of an electrical device within a real estate property.

In some examples, a real estate property registered with the digital ecosystem 108 may be equipped with one or more electrical devices. Those electrical devices may be enabled smart technology for home automation, including but not limited to electronically unlock a door, control a thermostat to change temperature of a room, recording a video with cameras in the front and back of a house, or the like. Such electrical devices may have control panels for a user to change settings as needed on site. Referring to FIG. 8, an exemplary electrical device 120 may be equipped with any registered real estate property (e.g., 110(1)-1, 110(2)-1, 110(5)-1 in FIG. 4). Such electrical device 120 may communicatively connect with one of the client devices 104(1)-104(n), illustrated as client device 104(a), via one or more communicative networks 112. Moreover, the electrical device 120 may communicatively connect with the platform management computing device 102 via one or more communicative networks 112, although this is not shown in FIG. 8 for simplicity. As illustrated in FIG. 8, the electrical device 120 may have one or more processors 1202, a communication interface 1204, a memory 1208, an input device 1210, and a display device 1212 which are coupled together by a bus 1206, although the electrical device 120 could have other types and/or numbers of systems, devices, components and/or other elements in other configurations. The input device 1210 allows a user to input any setting(s) on site, and the display device 1212 may display the settings configured for the electrical device 120 to a user. In this example, the memory 1208 has an identification module 12082 for the platform management computing device 102 and its relevant module(s) to identify the electrical device 120 (e.g., an electrical device ID). The memory 1208 further comprises a control module 12084, which can be controlled by a user either on site via the input device 1210 or remotely via the platform management computing device 102. It is to be understood that the status of the electrical device 120 may be retrieved and transmitted to the platform management computing device 102 via the communication interface 1104. In this way, a status of the electrical device 120 may also be stored to the digital ecosystem 108, via the platform management computing device 102.

In various examples discussed in conjunction with FIGS. 1-13 above, all the real estate property data may be stored in any appropriate number of databases 106(1)-160 (*n*). In some examples, data having different safety requirements may be maintained separately. For example, social security numbers, passport numbers, or other more sensitive and private data may be stored in a separate database. This type of data may subject to a stricter verification process to determine an authenticity of a user who is trying to access to such data. This may enhance the security of the stored data and thereby reduce the possibility of information leakage or attack.

Accordingly, as described and illustrated by way of the examples herein, this technology provides methods, non-transitory computer readable media, and computing devices that manage a digital ecosystem for real estate property data. As illustrated by the examples herein, this technology creates a digital ecosystem for a given geographic region and divides the geographic region into one or more smaller geographic areas. The digital ecosystem may register, store, and manage all related real estate property data for any real estate property that located within the given geographical region. Within each geographic area, the digital ecosystem may manage all its stored real estate property data as a unit or group. That is to say, the digital ecosystem may manage real estate property data on a smaller geographic area basis. This allows the digital ecosystem to assign or allocate the same or similar resource(s) (e.g., insurance service, maintenance service, repair service) to all the related real estate properties within the same geographic area or nearby geographic areas. In other words, the geographic area basis structure of the digital ecosystem enables data integration and a resource sharing within one geographic area or across geographic areas located closely with each other. This may not only improve resource usage, but also processing efficiency. In some examples, the digital ecosystem may access various third-party data resource(s) as needed, resulting in more robust and powerful system for managing the real estate property data. Moreover, in some examples, the digital ecosystem may further retrieve related data from the third-party resource(s) and integrate the retrieved data with its own stored data after a verification of the data authenticity. This may further improve the quality and correctness of an execution of a user's requested processing on the stored real estate property data.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:

extracting, by a computing device, identifier data for and actionable information in real estate property data in a received request from a client device;

determining, by the computing device, whether geolocation data obtained based on the extracted identifier data for the real estate property data in the received request is located within one of one or more predefined stored geographic areas and whether the real estate property data is pre-registered with a digital ecosystem that stores and manages data for real estate properties within the one or more predefined stored geographic areas;

in response to the determination that the real estate property data is located within the one of the one or more predefined stored geographic areas and the real estate property data is pre-registered, determining, by the computing device, an executable action for the real estate property data based on the actionable information extracted from the received request submitted by an authenticated user via the client device;

executing, by the computing device, the executable action for the real estate property data; and displaying, by the computing device, an execution result of the real estate property data via a user interface of the client device.

2. The method as set forth in claim 1, wherein the extracting the actionable information further comprising:

performing natural language processing on information in the received request to identify the actionable information regarding the real estate property data.

3. The method as set forth in claim 2, wherein the determining the executable action for the real estate property data comprises:

classifying the actionable information based on predetermined classification rules to obtain a classification result; and generate an executable action for the real estate property data based on the classification result and the actionable information.

4. The method as set forth in claim 3, wherein the classification result of the actionable information is associated with a transactionable action on the real estate property data, the executing the executable action for the real estate property data further comprising:

in response to the real estate property data being executed, determining one or more changes to a status of the real estate property data;

wherein, displaying the execution result of the real estate property data via the user interface comprising displaying an updated status of the real estate property data.

5. The method as set forth in claim 4, wherein the transactionable action comprises transferring at least a part of an ownership of related real estate property, the executing the executable action for the real estate property data further comprising:

tokenizing the ownership of the real estate property into ownership tokens, each of which represents a different part of the ownership of the real estate property;

executing the transferring to update the ownership tokens in the real estate property data based on the transactionable action;

wherein, displaying the execution result of the real estate property data via the user interface comprising displaying an updated ownership in the real estate property data.

6. The method as set forth in claim 3, wherein the classification result of the actionable information is associated with maintenance action on the real estate property data, the executing the executable action for the real estate property data further comprising:
   retrieving information relating to the maintenance action from a data storage;
   wherein, displaying the execution result of the real estate property data via the user interface comprising displaying the retrieved information to the authenticated user, wherein the retrieved information comprises one or more operations selectable by the authenticated user to execute the maintenance action.

7. The method as set forth in claim 3, wherein the classification result of the actionable information is associated with an action on an electrical device data of the real estate property data, the executing the executable action for the real estate property data further comprising:
   identifying the related electrical device data in the real estate property data;
   executing the action on the electrical device data;
   wherein, displaying the execution result of the real estate property data via the user interface comprising displaying information indicating an updated status of the electrical device data after executing the action.

8. A computing device, comprising a memory comprising programmed instructions stored thereon and one or more processors configured to execute the stored programmed instructions to:
   extract identifier data for and actionable information in real estate property data in a received request from a client device;
   determine whether geolocation data obtained based on the extracted identifier data for the real estate property data in the received request is located within one of one or more predefined stored geographic areas and whether the real estate property data is pre-registered with a digital ecosystem that stores and manages data for real estate properties within the one or more predefined stored geographic areas;
   in response to the determination that the real estate property data is located within the one of the one or more predefined stored geographic areas and the real estate property data is pre-registered, determine an executable action for the real estate property data based on the actionable information extracted from the received request submitted by an authenticated user via the client device;
   execute the executable action for the real estate property data; and
   display an execution result of the real estate property data via a user interface of the client device.

9. The computing device as set forth in claim 8, further comprising:
   perform natural language processing on information in the received request to identify the actionable information regarding the real estate property data.

10. The computing device as set forth in claim 9, wherein the determine the executable action for the real estate property data comprises:
   classify the actionable information based on predetermined classification rules to obtain a classification result; and
   generate an executable action for the real estate property data based on the classification result and the actionable information.

11. The computing device as set forth in claim 10, wherein the classification result of the actionable information is associated with a transactionable action on the real estate property data, the execute the executable action for the real estate property data further comprising:
   in response to the real estate property data being executed, determine one or more changes to a status of the real estate property data;
   wherein, display the execution result of the real estate property data via the user interface comprising display an updated status of the real estate property data.

12. The computing device as set forth in claim 11, wherein the transactionable action comprises transfer at least a part of an ownership of related real estate property, the execute the executable action for the real estate property data further comprising:
   tokenize the ownership of the real estate property into ownership tokens, each of which represents a different part of the ownership of the real estate property;
   execute the transferring to update the ownership tokens in the real estate property data based on the transactionable action;
   wherein, display the execution result of the real estate property data via the user interface comprising display an updated ownership in the real estate property data.

13. The computing device as set forth in claim 10, wherein the classification result of the actionable information is associated with maintenance action on the real estate property data, the execute the executable action for the real estate property data further comprising:
   retrieve information relating to the maintenance action from a data storage;
   wherein, display the execution result of the real estate property data via the user interface comprising display the retrieved information to the authenticated user, wherein the retrieved information comprises one or more operations selectable by the authenticated user to execute the maintenance action.

14. The computing device as set forth in claim 10, wherein the classification result of the actionable information is associated with an action on an electrical device data of the real estate property data, the execute the executable action for the real estate property data further comprising:
   identify the related electrical device data in the real estate property data;
   execute the action on the electrical device data;
   wherein, display the execution result of the real estate property data via the user interface comprising display information indicating an updated status of the electrical device data after executing the action.

15. A non-transitory computer readable medium having stored thereon instructions comprising executable code which when executed by one or more processors, causes the one or more processors to:
   extract identifier data for and actionable information in real estate property data in a received request from a client device;
   determine whether geolocation data obtained based on the extracted identifier data for the real estate property data in the received request is located within one of one or more predefined stored geographic areas and whether the real estate property data is pre-registered with a digital ecosystem that stores and manages data for real estate properties within the one or more predefined stored geographic areas;
   in response to the determination that the real estate property data is located within the one of the one or more predefined stored geographic areas and the real estate property data is pre-registered, determine an executable action for the real estate property data based on the actionable information extracted from the received request submitted by an authenticated user via the client device;

execute, the executable action for the real estate property data; and display an execution result of the real estate property data via a user interface of the client device.

16. The non-transitory computer readable medium as set forth in claim 15, further comprising:

perform natural language processing on information in the received request to identify the actionable information regarding the real estate property data.

17. The non-transitory computer readable medium as set forth in claim 16, wherein the determine the executable action for the real estate property data comprises:

classify the actionable information based on predetermined classification rules to obtain a classification result; and generate an executable action for the real estate property data based on the classification result and the actionable information.

18. The non-transitory computer readable medium as set forth in claim 17, wherein the classification result of the actionable information is associated with a transactionable action on the real estate property data, the execute the executable action for the real estate property data further comprising:

in response to the real estate property data being executed, determine one or more changes to a status of the real estate property data;

wherein, display the execution result of the real estate property data via the user interface comprising display an updated status of the real estate property data.

19. The non-transitory computer readable medium as set forth in claim 17, wherein the classification result of the actionable information is associated with maintenance action on the real estate property data, the execute the executable action for the real estate property data further comprising:

retrieve information relating to the maintenance action from a data storage;

wherein, display the execution result of the real estate property data via the user interface comprising display the retrieved information to the authenticated user, wherein the retrieved information comprises one or more operations selectable by the authenticated user to execute the maintenance action.

20. The non-transitory computer readable medium as set forth in claim 17, wherein the classification result of the actionable information is associated with an action on an electrical device data of the real estate property data, the execute the executable action for the real estate property data further comprising:

identify the related electrical device data in the real estate property data;

execute the action on the electrical device data;

wherein, display the execution result of the real estate property data via the user interface comprising display information indicating an updated status of the electrical device data after executing the action.

* * * * *